United States Patent [19]

Richard

[11] 4,261,649
[45] Apr. 14, 1981

[54] REFLECTIVE SUN SCREEN

[76] Inventor: Joseph Richard, 8242 E. 20th St., Tucson, Ariz. 85710

[21] Appl. No.: 35,789

[22] Filed: May 3, 1979

[51] Int. Cl.³ .............................................. G02B 27/00
[52] U.S. Cl. ............................... 350/276 R; 296/97 F
[58] Field of Search ..................... 350/276 R, 156, 1.7, 350/266, 264, 263; 296/97 F; D12/182; D16/51; D23/142; 136/189

[56] References Cited

U.S. PATENT DOCUMENTS

| | | | |
|---|---|---|---|
| 1,426,716 | 8/1922 | Custer | 296/97 F |
| 1,844,289 | 2/1932 | Littlejohn | 296/97 F |
| 2,918,709 | 12/1959 | Corcoran | 350/263 |
| 3,042,561 | 7/1962 | Iwashita | 296/97 F |
| 3,630,809 | 12/1971 | Edwards | 350/264 |
| 3,642,557 | 2/1972 | Warp | 350/276 R |
| 3,695,680 | 10/1972 | Van Sickle | 296/97 F |
| 3,698,761 | 10/1972 | Niwa | 296/97 F |

Primary Examiner—John K. Corbin
Assistant Examiner—B. W. de los Reyes
Attorney, Agent, or Firm—Cahill, Sutton & Thomas

[57] ABSTRACT

A reflective sun screen for installation adjacent a curved automobile window pane includes a semi-rigid sheet of transparent acrylic resin and a layer of flexible tinted reflective mylar material laminated to the outer surface of the semi-rigid sheet. The semi-rigid sheet is held against a flexible frame surrounding the window pane by means of a plurality of rigid but bendable brackets. The brackets engage the edge of the semi-rigid sheet to cause the semi-rigid sheet to be everywhere roughly equidistant from the window pane. One end of each of the brackets is inserted beneath an edge of the flexible frame to engage metal of the vehicle body. The brackets are bent to engage the edges of the semi-rigid sheet, forcing it against the surface of the flexible pane and maintaining the semi-rigid sheet in a configuration which conforms to the contour of the window pane.

16 Claims, 11 Drawing Figures

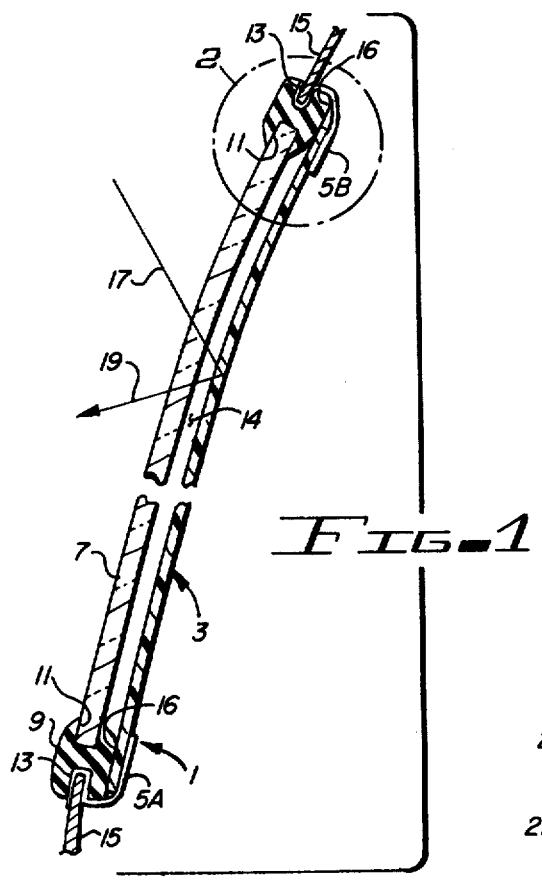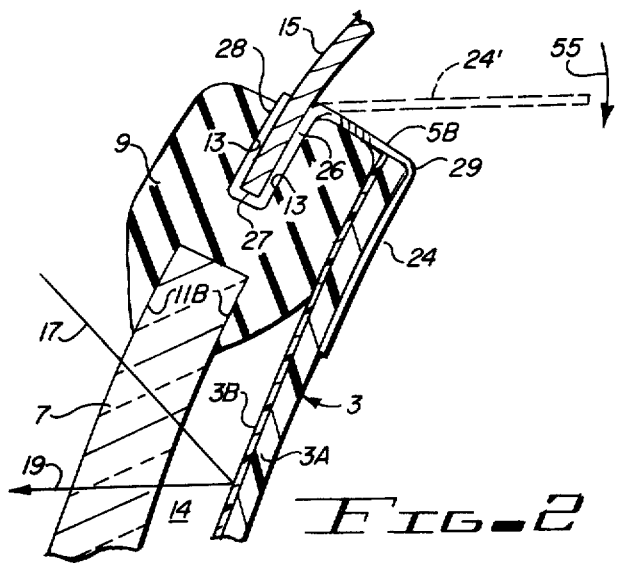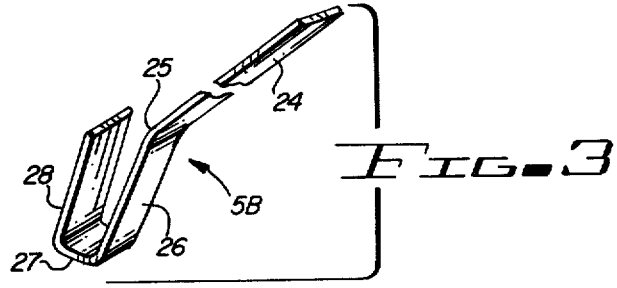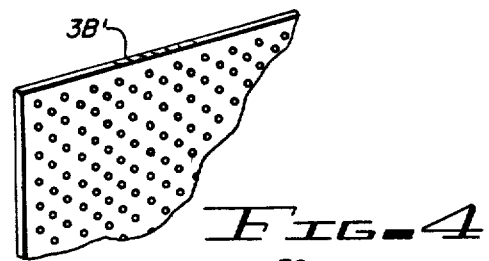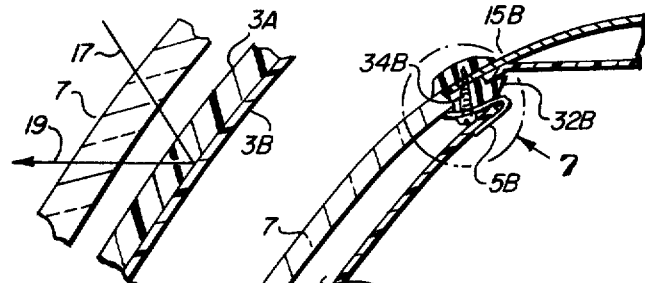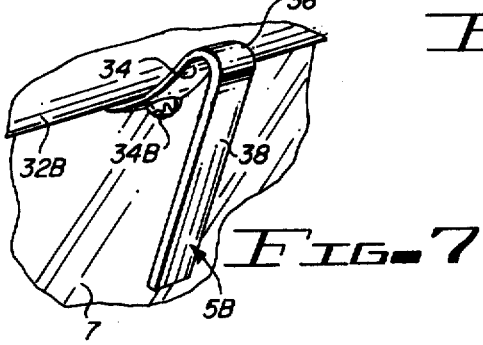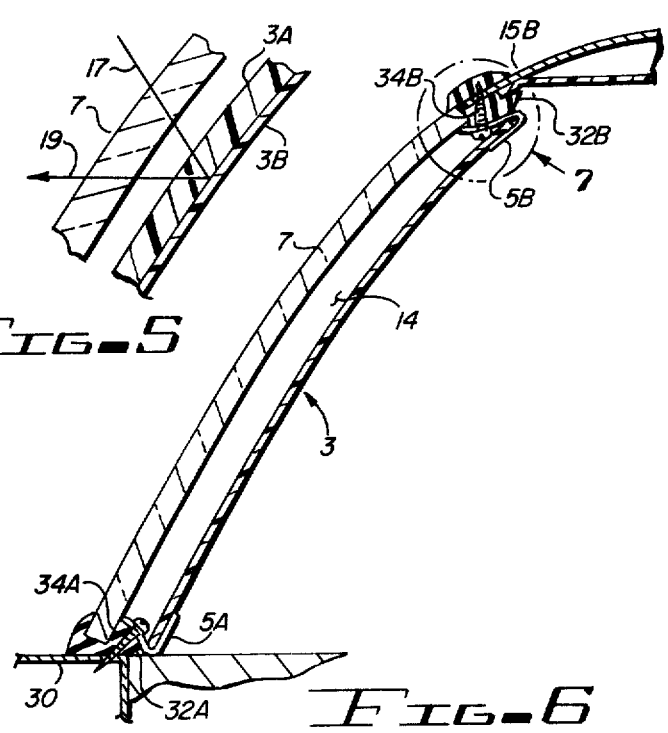

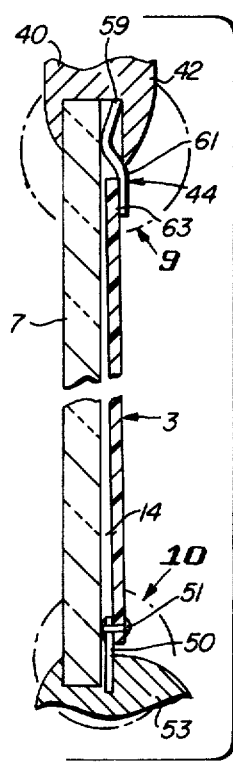
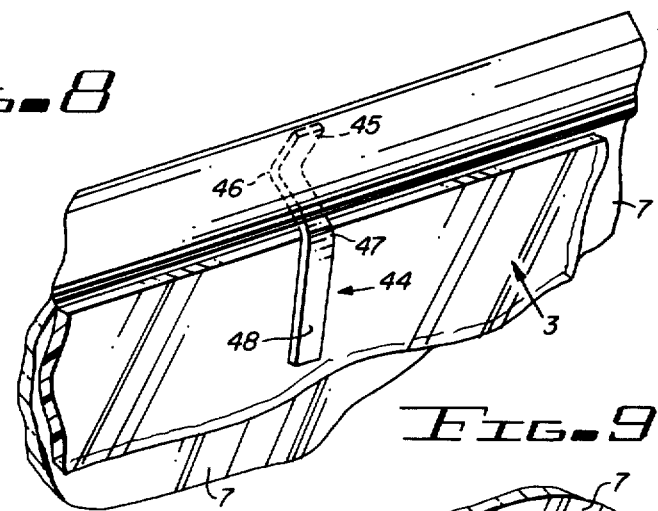
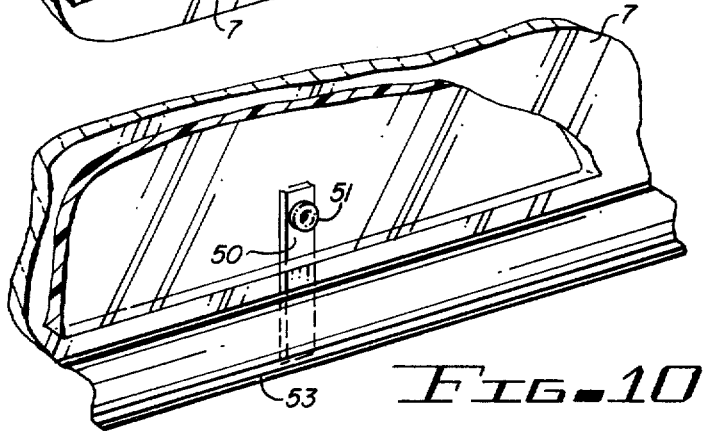
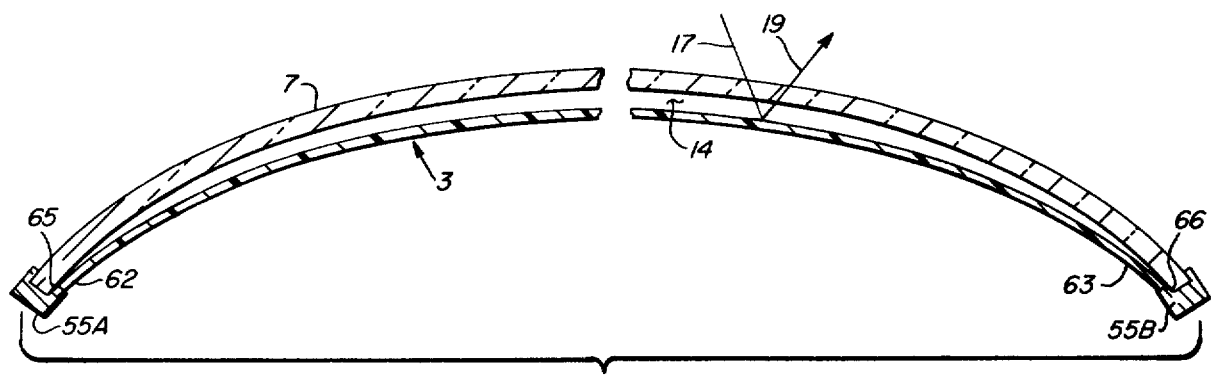

REFLECTIVE SUN SCREEN

BACKGROUND OF THE INVENTION

1. Field of the Invention

The invention relates to sun screens for reducing intensity of sunlight flowing into an interior of a vehicle or building, and more particularly, to sun screens having reflective surfaces everywhere spaced from a curved or contoured window pane.

2. Description of the Prior Art

In hot climates, such as the Southwestern states of the United States, the sun's rays can rapidly deteriorate the interiors of automobiles. Further, the heating effect of the sun's rays within an automobile is frequently greater than the cooling capacity of automotive air conditioning units, causing considerable discomfort to the occupants during operation of the automobile. Various devices have been proposed for alleviating the above conditions. For example, venetian blinds have been mounted interior to rear windows of automobiles. However, venetian blinds are expensive, cumbersome and unattractive and further impair vision to a degree inconsistent with safe operation of a vehicle. Various types of flexible plastic retractable shades have been mounted interior to automobile windows. However, such devices are expensive, cumbersome, unattractive and easily damaged.

Accordingly, it is an object of the invention to provide a sun screen device for reducing intensity of sunlight entering a vehicle, wherein the sun screen device is less expensive, less cumbersome, and more attractive than previous venetian blind or retractable shade devices.

U.S. Pat. No. 3,698,761 discloses use of a flexible or semi-rigid colored or tinted sheet of acrylic resin cut to fit a contoured rear window of an automobile. The disclosed sheet includes integral tabs extending from the periphery of the precut resin sheet for insertion beneath a flexible flange of a window frame, causing bending of the semi-rigid sheet so that surface-to-surface contact exists along the acrylic sheet and the inner surface of the window pane. The surface of the tinted sheet intercepts or filters some of the incident sunlight. However, the filtering occurs inside the vehicle, and the tinted sheet therefore dissipates a substantial amount of heat which is subsequently conveyed to the interior portions of the vehicle by thermal conduction. Further, the temperature of the acrylic material is greatly increased, causing rapid deterioration thereof. The semi-rigid sheet of U.S. Pat. No. 3,698,761 is pressed against the window pane to prevent formation of mist on the window pane due to extreme temperature differences between inside and outside of the vehicle. However, this prevents rapid removal of heat built up in the acrylic sheet, thereby furthering deterioration of the acrylic sheet due to the excessive heat.

It is therefore another object of the invention to provide a semi-rigid sun screen device which avoids excessive buildup of heat which leads to rapid deterioration of the sun screen.

Yet another object of the invention is to provide a flexible sun screen system which allows air circulation between a window pane and a flexible sun screen to effect rapid removal of heat absorbed by the sun screen to prevent deterioration of the sun screen due to excessive heat buildup therein.

Still another object of the invention is to provide a semi-rigid sun screen which absorbs less heat than sun screens of U.S. Pat. No. 3,698,761.

The sun screen described in U.S. Pat. No. 3,698,761, once installed, is not easily removable due to the manner in which the tabs extend under the flexible frame of the window pane, causing "bowing" of the acrylic sheet into intimate surface-to-surface contact with the window pane. Removal of the acrylic sheet, especially if it has deteriorated due to excessive heat buildup, may result in damage to or destruction of the acrylic sheet which precludes further use thereof. Since it is frequently quite desirable to remove sun screens in the cooler seasons to allow more sunlight to enter a vehicle, it is highly desirable that the sun screens be easily removed.

It is therefore a further object of the invention to provide a flexible sun screen which is easily removable without damage thereto.

The flexible window frames or grommets surrounding rear windows of many automobile models are subject to variations in size. If the sun screen described in U.S. Pat. No. 3,698,761 is not precisely cut to match the inner dimensions of the inner surface of the frame-supporting grommet of a particular vehicle, there may be unattractive light leaks between the edge of the sun screen and the inner surface of the flexible grommet. Alternatively, if the dimensions of the sun screen are slightly too large, it may not be possible to install the sun screen without trimming certain portions of the sun screen edge.

It is therefore a still further object of the invention to provide a flexible sun screen which can be easily installed without precise matching of the flexible sun screen to inner dimensions of a frame or grommet supporting or surrounding a window pane.

A reflective mylar substance is frequently attached to interior surfaces of window panes by means of adhesive. However, this approach has several serious shortcomings. One is that the incident sunlight attacks the adhesive before and after being reflected by the reflective mylar. This causes rapid deterioration and discoloration of the adhesive.

Accordingly, it is a still further object of the invention to provide a reflective sun screen which avoids or reduces discoloration or chemical deterioration due to cumulative affects of ambient sunlight.

A novelty search directed to the present invention uncovered the following additional U.S. Pat. Nos. which are believed to be representative of the state of the art: 1,571,019, 2,349,470, 2,546,609, 2,625,217, 3,025,098, 3,266,560, 3,312,023, 3,868,293, 3,847,201, 2,757,040, 3,276,943 and British Pat. No. 879,130.

A yet further object of the invention is to provide a sun screen device which overcomes the shortcomings of the known prior art.

SUMMARY OF THE INVENTION

Briefly described, and in accordance with one embodiment thereof, the invention provides a reflective sun screen for attachment adjacent to an interior surface of a window pane including a semi-rigid sheet of transparent synthetic resin having a transparent reflective surface layer. The semi-rigid sheet is attached to or engaged with a frame or molding surrounding or supporting the window pane to support the semi-rigid sheet in spaced relationship with the window pane such that the semi-rigid sheet is bent to approximately follow any contour of the window pane. In the described embodiment of the invention, the semi-rigid sheet is formed of acrylic resin, and the reflective surface layer is formed of a flexible sheet of reflective mylar laminated to the outer surface of the semi-rigid sheet. A variety of different rigid but bendable metal attachment brackets are utilized to accomplish supporting of the semi-rigid sheet in spaced relationship with the window pane. For a window pane supported by means of a surrounding flexible grommet having an inner groove which engages the edges of the window pane and an outer groove which engages the metal frame of an automobile, the bracket has a U-shaped hook at one end thereof. The U-shaped hook is forced into the outer groove of the flexible grommet and hooked around the interior edge of the vehicle frame material. A plurality of such brackets are installed at suitable points along the periphery of the flexible grommet. During installation of the reflective sun screen, the semi-rigid sheet is held against the inner surface of the flexible grommet and is pushed inwardly to approximately follow the contour of the window pane. The free ends of the brackets then are bent inwardly against the edges of the semi-rigid sheet, holding it tightly against the flexible grommet and forcing the edges of the semi-rigid sheet inwardly with sufficient force to maintain the above mentioned contour.

Ambient sunlight passing through the window pane strikes the reflective mylar surface. A large portion of the ambient light is reflected without even passing through adhesive bonding the reflective layer to the acrylic resin sheet or the acrylic resin sheet itself. Degradation and/or discoloration of the mylar, adhesive, and acrylic resin is greatly reduced compared to that of previous reflective or filtering layers adhesively attached to inner window pane surfaces.

In one embodiment of the invention, the reflective mylar is perforated. In another embodiment of the invention, the mylar is tinted. In yet another embodiment of the invention, the brackets are screwed into plastic molding surrounding the window pane. In still another embodiment of the invention, wherein an automobile rear window is radically outwardly contoured, a semi-rigid reflective sheet is precisely precut so that its edges engage molding surrounding the window immediately adjacent the edges of the window pane. The resiliency of the reflective semi-rigid sheet maintains it in a contoured configuration without use of mounting brackets. In yet still another embodiment of the invention, small air circulation holes are provided in the reflective semi-rigid sheet to enhance air circulation in the air gap between the window pane and the outer surface of the reflective semi-rigid sheet to improve removal of heat from the air gap region.

BRIEF DESCRIPTION OF THE DRAWINGS

FIG. 1 is an edge view of the reflective sun screen of the invention installed adjacent a curved window pane by means of a first type of bracket.

FIG. 2 is an enlarged sectional view of detail 2 of FIG. 1.

FIG. 3 is a partial perspective view of the bendable mounting bracket shown in FIG. 2.

FIG. 4 is a partial perspective view illustrating a perforated reflective mylar material which can be used as the reflective layer of the semi-rigid reflective sheet of FIG. 2.

FIG. 5 discloses an alternate configuration of the reflective semi-rigid sheet wherein the reflective surface is interior rather than exterior.

FIG. 6 is an edge view of an installation of the reflective semi-rigid sun screen of the invention using an alternate type of mounting bracket.

FIG. 7 is an enlarged view of detail 7 of FIG. 6.

FIG. 8 is an edge view of yet another type of installation of the reflective sun screen of the invention utilizing yet another type of mounting bracket.

FIG. 9 is an enlarged view of detail 9 of FIG. 8.

FIG. 10 is an enlarged view of detail 10 of FIG. 8.

FIG. 11 is a partial edge view of another technique for installing the reflective sun screen of the invention adjacent a radically contoured window pane.

DESCRIPTION OF THE INVENTION

Referring now to the drawings, and particularly to FIG. 1, reflective sun screen 3 is installed adjacent a curved automobile window pane 7, which typically is the rear window of an automobile and may have a considerable amount of curvature, especially near its outer edges. Window pane 7 is supported by means of a frame consisting of a grommet having an inner groove 11 and an outer groove 13 disposed therein. The entire peripheral edge of window pane 7 is firmly inserted in inner groove 11. The metal 15 of the automobile surrounding an opening in which window 7 is disposed, is inserted firmly into outer groove 13.

Reflective sun screen 3 has a shape which corresponds to the shape of window pane 7, but is slightly larger, as explained subsequently. Window pane 3 is clamped against the inner surface 16 of grommet 9 by means of a plurality of rigid but bendable aluminum clamps, such as 5A and 5B. A plurality of such clamps are spaced as needed around the periphery of window pane 7 to clamp reflective sun screen 3 so that it is maintained in spaced relationship to window pane 7, maintaining an air gap region 14 between reflective sun screen 3 and window pane 7 while ensuring that reflective sun screen 3 tends to follow the contour of window pane 7. The details of aluminum mounting bracket 5B are more clearly illustrated in the enlarged detail drawing of FIG. 2. Mounting bracket 5B is shown in its initial unbent configuration in FIG. 3.

Referring now to FIG. 3, mounting bracket 5B includes a hook end consisting of opposed sections 26 and 28 joined by end section 29. A screen retaining section 24 is joined to section 26 at bend 25.

Referring now to FIG. 2, it is seen that hook end 26, 27, 28 is disposed in groove 13 of grommet 9 and metal 15 of the automobile body extends into the region bounded by hook shaped end 26, 27, 28.

Since grommet 9 is ordinarily made of flexible plastic or rubber-like material, the required mounting brackets can be forced into groove 13 before reflective sun screen 3 is installed. Initially, the retaining portions of each bracket extend as indicated by dotted line 24' in FIG. 2.

Reflective sun screen 3 (which is precut to proper size) is then held against inner surface 16 of grommet 9, and the screen engaging portions 24 of the respective mounting brackets 5A, 5B, etc., are bent in the direction indicated by arrow 55 in FIG. 2 to engage the edge of reflective sun screen 3. As shown in FIG. 2, screen engaging portion 24 of bracket 5B undergoes a sharp bend 29, and is pressed tightly against the edge of sun screen 3.

FIG. 2 further discloses the detailed structure of sun screen 3. More specifically, sun screen 3 includes a semi-rigid transparent sheet 3A of acrylic resin, which may be either cast or extruded. A thickness in the range from 40 to 80 mils is quite satisfactory. A reflective layer 3B is provided on the outer surface of semi-rigid sheet 3A. The reflective layer 3B is preferably tinted, and may be adhesively attached to the outer surface of semi-rigid sheet 3A.

Suitable cost or extruded acrylic sheets of the desired thickness are readily commercially available from a number of manufacturers, such as DuPont. Reflective layer 3B can be tinted, metalized polyester film, such as film sold under the trademark "REFLECTO-SHIELD", manufactured by Madico. REFLECTO-SHIELD has a suitable adhesive already disposed on its inner surface. Perforated metalized mylar can be readily used. Decorative patterns can be provided on the reflective layer 3B or 3B'.

It should be noted that reflective layer 3B can be provided on the inner surface of reflective sun screen 3, as indicated in FIG. 5, rather than on the outer surface. However, if the reflective layer 3B is provided on the outer surface, as shown in FIGS. 1 and 2, then incoming rays of light indicated by reference numeral 17, pass through window pane 7 and air region 14, and strike reflective layer 3B and are reflected, as indicated by reference numeral 19, without passing through either semi-rigid acrylic resin layer 3A or the adhesive bonding reflective layer 3B to semi-rigid acrylic layer 3A. Usually, this will be highly desirable, since intense sunlight degrades and discolors most adhesives and also tends to degrade acrylic resin layers. By providing reflective layer 3B on the outer surface of reflective sun screen 3, a substantial amount of the ambient light is reflected. Consequently, less sunlight is absorbed and converted to heat, so there is less interior heating of the vehicle due to convective transmission of heat away from reflective sun screen 3, and there is less degradation and/or discoloration of the adhesive and acrylic resin material due to the combined effect of heat and direct action of sunlight.

FIG. 4 illustrates a piece of perforated mylar 3B' which can be utilized to implement reflective layer 3B of reflective sun screen 3.

FIG. 6 discloses an alternate mounting bracket or clamp configuration which is useful when the molding 32A, 32B is not sufficiently flexible to allow use of the technique previously explained with reference to FIGS. 1 and 2. Aluminum mounting brackets 30A and 30B are attached by means of screws 34A and 34B to molding strips 32A and 32B, respectively. Brackets 5A and 5B, each have a screen retaining portion which is initially unbent similar to the configuration indicated by dotted lines 24' in FIG. 2. Reflective sun screen 3 is held in the desired position with respect to window pane 7, and the screen retaining portions of the respective mounting brackets 5A and 5B are then bent against the edge of reflective sun screen 3 to provide the configuration shown in FIGS. 6 and 7, the latter being an expanded detail view of the bracket 5B, with the sun screen 3 omitted for clarity.

FIG. 8 discloses an alternative technique for mounting reflective sun screen 3; this technique is particularly useful for rear side windows of many automobiles. Such side windows typically are slightly contoured outwardly, but are substantially vertical, and receive ambient sunlight at very low angles of incidence. Thus, considerably less heat energy enters the automobile through vertical side windows than through rear windows of many vehicles, since the rear windows are frequently quite radically sloped. Thus, for side windows, the air gap region 14 between window pane 7 and reflective sun screen 3 need not be as large as for sloped rear windows.

Frequently, interior plastic molding, such as 42 and 53 in FIG. 8, extends over the peripheral edges of a side window pane, but does not suppport the window pane. For this type of side window, a lower clamp 50 consisting of a piece of straight aluminum bracket material is riveted by means of rivet 51 to the lower edge of reflective sun screen 3. A plurality of such straight brackets are disposed along the lower molding 53. After the brackets 50 are attached, reflective sun screen 3 is positioned so that the portions of brackets 50 extending below the lower surface of reflective sun screen 3 are inserted between the edge of molding 53 and window pane 7. A plurality of upper mounting brackets, such as 44, bent in the configuration shown in FIG. 8, are inserted between the inner lip of upper molding 42 and the surface of window pane 7. The bracket is bent sufficiently at points 57, 59 and 61 to press outwardly on the inner portion of upper molding 42 and on the inner surface of window pane 7. End 63 of upper bracket 44 is pressed tightly against the upper edge of reflective sun screen 3. It has been found that a plurality of brackets such as 44 spaced along the upper molding strip 42 reliably and securely holds reflective sun screen 3 against a side window pane in the configuration indicated in FIG. 7.

Enlarged perspective views of upper bracket 44 and lower bracket 50 are shown in FIGS. 9 and 10, respectively. Referring now to FIG. 9, a section view of a radically curved rear window pane, such as the type used on the 1978 Porsche 924, is illustrated. For this configuration, reflective sun screen 3 is installed without using brackets. Instead, the semi-rigid reflective sun screen 3 is pressed against the inner surface of window pane 7 until its ends 62 and 63 pass upward and over lips 65 and 66 of molding or grommet sections 55A and 55B, respectively. The dimensions of reflective sun screen 3 are precisely precut to provide a satisfactory gap or air space region 14 between the inner surface of window pane 7 and the reflective surface of reflective sun screen 3.

The reflective sun screens disclosed in the above described embodiments of the invention are very easily installed in most automobiles, and have the further advantage that they are also very easily removed to allow cleaning of the interior window pane surfaces and to allow cleaning of both surfaces of the reflective screens. The described reflective sun screens permit less ambient sunlight to be transmitted through the above mentioned adhesive and acrylic materials and absorb less heat than most prior sun screens or filtering devices.

The described reflective sun screens are very easily and inexpensively manufactured, since sheets of acrylic resin having reflective layers thereon can be stacked and precisely cut by utilizing templates corresponding to window dimensions of various models of automobiles to guide cutting with a band saw. There is no necessity of providing support frames for the reflective material because of the semi-rigid character of the acrylic resin sheet material. The described aluminum brackets are reasonably easily bendable, and can be easily unbent for convenient removal of the reflective screens.

The embodiments of the invention shown in FIGS. 1 and 6 avoid installation difficulties caused by minute variations in window size and grommet size which would occur if the semi-rigid screen were placed in surface-to-surface contact with the window pane. The air gap provided between the reflective sheet and the window pane in each of the described embodiments of the invention allows for air circulation, thereby preventing excessive and damaging heat buildup which occurs in the absence of the air gaps. If desired, small holes can be provided in preselected portions of the reflective sun screen to enhance air circulation in the air gap, although this is not normally necessary.

The described embodiments of the invention circumvent most of the difficulties associated with manufacture and installation of certain prior sun screening devices which involve framing and transversely bracing relatively flimsy or limp sun screening materials.

The described embodiments of the invention provide the appearance of being smoothly and continuously fixed to the inner surface of the window pane when viewed from outside of the vehicle, and yet avoid the problems of wrinkling, peeling, bubbling, etc. involved when filtering or reflective materials are adhesively attached to the inner surfaces of window panes. The described embodiments of the invention are far more attractive and less clumsy and bulky in appearance and in use than certain prior screening devices, such as venetian blinds and retractable shade screens.

When used in a building, the above reflective sun screen design discussed above can be reversed to serve as a thermal insulating barrier and a radiant heat collector for use adjacent to the inner surface of a window pane of the building.

When used in the reversible mode, the reflective screen is made from a 80-100 mil clear cast, extruded, or continuously cast acrylic sheet with an outer layer of homogeneously transparent metalized polyester film such that sold under the name "REFLECTO-SHIELD" by Madico. The reflective screen is mounted by means of a set of slidable or rotatable installation tabs to be mounted at various points on the window frame along the periphery of the pane to enable convenient removal and reversal of the reflective screen. Alternatively, a set of "push-pin" tabs inserted into the rubber gasket or wooden frame of a pane after the screen has been placed in position either against the surface of the pane or against the perimeter of the window frame can be used to firmly hold the screen against the pane or against the window frame.

The outer layer of film has two opposed surfaces, one of which is highly reflective, and if tinted or colored, only very lightly so. The other surface is darkly colored or tinted so as to be primarily non-reflective. This layer is adhesively bonded to the acrylic sheet so that the darkly colored surface is located at the interface between the outer layer and the acrylic sheet. Thus, the semi-rigid sheet (much like screen 3 in FIGS. 2 and 5) has two opposed surfaces, one a highly reflective one and the other a clear, uncolored acrylic surface whose outward appearance is rather dark and non-reflective. Radiant energy transmission through this screen is reduced by approximately 80%, yet daytime visibility in the outward direction in clear, pleasant and glare-free.

In the hot summer months, the highly reflective outer surface of the reversible reflective screen is oriented so that it first encounters incoming solar energy after such energy has passed through the window pane. The reflective outer surface immediately reflects and re-radiates substantial quantities of the received radiant energy in the outward direction and simultaneously shields the acrylic sheet material from the incoming sun. Since the outside air temperature is also quite high (much greater than the inside room temperature), the acrylic panel will also serve to substantially diminish conduction of heat into the room through the pane, which is superior to ordinary glass as a thermal insulator. Thus, the reversible reflective screen's high reflectivity in this orientation minimizes radiant heat absorption by the screen and heat accumulation in any air space between the reversible reflective screen and the window pane.

In the relatively cold winter months, the direction of the reversible reflective screen may be readily reversed so that the darkly colored, non-reflective surface is exposed to the incoming radiant energy. The incoming energy penetrates the window pane and the clear acrylic layer and is intercepted by the dark surface of the previously described layer where much of it is converted to molecular kinetic energy, i.e., to heat. This heat or thermal energy is then transmitted by conduction to the immediately adjacent room air and then is conducted by convection through the interior of the room. The transparent uncolored acrylic material (approximately 1/16 to ⅛ of an inch in thickness) greatly reduces the tendency of this thermal energy to be conducted outward toward the pane, through the pane and outward to the cool outside air.

When the screen is not directly intercepting incoming solar energy, for example, during the night or times of cloudiness, it is functioning as a thermal insulating barrier, reducing the heat exchange rate between the inside and outside of the building. Further, since the highly reflective layer now inwardly faces the room, it also serves to reflect back into the room a great part of the internal ambient radiant energy of the room which would otherwise be lost through the window pane. Thus, the described reversible sun screening-absorbing device constitutes a major and manifold advance in energy conservation far beyond merely converting ordinary windows into double pane windows.

It should be further noted that the use of acrylic sheeting yields an important safety feature when used in close proximity to ordinary glass. Its resistance to shattering makes it an effective barrier or shield should the outer window pane be shattered, perhaps by a child's baseball, greatly reducing the risk of injury to the occupants of the building.

Some differences in design concepts need to be pointed out for the cases when screen 3 is used in automotive vehicles and when it is used in its modified form for buildings as a reversible insulating sun screen and solar heating element. In the summer months of the desert Southwest, sunlight is exceedingly intense and outside air temperatures often exceed 110° F., and the air temperature in automotive vehicles often exceeds 140° F. The reflective or semi-reflective layer 3B of an automobile sun screen is preferably moderately tinted or colored so as to reduce the severity of the reflected sunlight which might in some rare circumstances be a safety hazard. The radiant energy not reflected or transmitted is absorbed and converted to heat within this outer layer 3B. Excessive heat buildup should be avoided for the reasons already discussed. (Fortunately, reflective layer 3B shields acrylic element 3A from 95%-99% of the incoming ultraviolet radiation.)

Hence, the previously mentioned ventilation of the region between 3B and the window pane. If the reflective layer 3B were at the inner surface of acrylic sheet 3A, large amounts of radiant energy would pass through 3A and be reflected back, again passing through 3A, which is not a desirable state of affairs as explained above, since acrylic sheet 3A is now exposed to 180 to 190 times the ultraviolet radiation as it would be if shielded by reflective layer of film 3B.

Next, summer and winter orientations of the modified screen 3 are discussed. In summer, the highly reflective, preferably untinted (or only very lightly tinted for aesthetic reasons) surface encounters and reflects the great bulk of incoming radiance. Since little if any incoming radiation is absorbed, no ventilation is required, unlike the situation when auto screens are used. In the wintertime orientation, the inherently less intense winter solar radiation penetrates acrylic sheet 3A and is intercepted by the dark inner surface of reflective layer 3B whereat the incoming radiation is transmitted, but most is absorbed. Nearly all of the incoming ultraviolet radiation is absorbed and/or blocked by the additional assistance of the metalized layer within 3B. Hence, acrylic sheet 3A is merely exposed to the relatively low intensity winter radiation and is protected from the double threat of the radiation that would be re-reflected through acrylic sheet 3A if reflective layer 3B were highly reflective on its inner surface as well. The relatively cold winter air temperatures also help to prevent excessive heat buildup with screen 3. Since the described heating occurs nearest the inside of the room, it is readily conducted and then convected into the room. High quality adhesives used at the interface of acrylic sheet 3A and reflective layer 3B can easily withstand the relatively low levels of wintertime solar radiation. A great many years of service is therefore assured.

In summary, the reversible reflective screen 3 described above for use in buildings adjacent to the inner surface of window panes has a number of advantages, including the following: it can function as a summer solar radiance reflector, as a winter solar heat collector/convection heater, as a thermal insulator, as a protective safety shield which stops flying shattered glass, as a wintertime reflector of internal thermal building radiation, it yields very pleasing and glare-free outward visibility, enhances the daytime privacy of the building's occupants, is easy to install and remove without affecting the surface of the window pane, and is very easy and inexpensive to mass produce.

While the invention has been described with reference to several particular embodiments thereof, those skilled in the art will be able to make various modifications to the described embodiments without departing from the true spirit and scope of the invention. For example, other reflective layers may be laminated to the acrylic resin sheet than the described perforated mylar or "REFLECTO-SHIELD" materials. For example, various reflective substances are known which may be sprayed on the outer surface of the semi-rigid acrylic resin sheet or other semi-rigid transparent sheet to provide the desired reflectivity, or, the outer surface of the semi-rigid acrylic resin sheet may be chemically treated to provide a reflective or semi-reflective surface. Various alternative bracket configurations could be readily provided by those skilled in the art. Either or both of the reflective layer and the body of the semi-rigid acrylic resin sheet may be tinted. The reflective sun screens described can also be utilized for window panes of buildings as well as automobiles.

I claim:

1. A reflective sun screen apparatus for attachment adjacent to an interior surface of a rear or side permanent window pane in a vehicle, said sun screen apparatus comprising in combination:
    (a) a transparent sheet of semi-rigid material, said transparent sheet having an outer surface and an opposed inner surface, said outer surface being adjacent to the window pane;
    (b) a reflective layer disposed on one of the outer and inner surfaces of said transparent sheet, said reflective layer being transparent; and
    (c) attachment means for engaging said transparent sheet with a frame or molding surrounding the window pane to support said transparent sheet inside said vehicle in fixed spaced relationship with the window pane to allow air to circulate through the region between the window pane and said transparent sheet, said transparent sheet being held by said attachment means to approximately follow an outer contour of the window pane, said attachment means including a plurality of spaced rigid brackets engageable with said frame or molding and also engageable with a plurality of spaced edge portions of said transparent sheet located at various respectively opposed points disposed around the periphery of such transparent sheet in order to hold said transparent sheet in fixed spaced relationship.

2. The reflective sun screen apparatus of claim 1 wherein said transparent sheet is made of acrylic resin.

3. The reflective sun screen apparatus of claim 1 wherein said transparent sheet is approximately one sixteenths of an inch in thickness.

4. The reflective sun screen apparatus of claim 3 wherein said reflective layer is reflective mylar.

5. The reflective sun screen apparatus of claim 4 wherein said reflective layer has a thickness in the range from approximately one to four mils.

6. The reflective sun screen of claim 4 wherein said reflective sheet is tinted.

7. The reflective sun screen apparatus of claim 1 wherein said window pane is installed in a vehicle, said vehicle having a flexible frame means supporting the window pane, said transparent sheet and said reflective layer being cut to have a boundary which approximately conforms with the outside perimeter of said flexible frame when said transparent sheet is disposed so that its outer surface is everywhere approximately equidistant from the window pane, said rigid brackets being bendable brackets, each of said brackets having one end which is inserted beneath the edge of the flexible frame to engage the body of the vehicle, each of said brackets being bent toward the window pane during installation of that bracket to engage the edge of said transparent sheet to press the edge of said transparent sheet against the flexible frame and to maintain the outer surface of said transparent sheet to be everywhere roughly equidistantly spaced from the window pane.

8. The reflective sun screen apparatus of claim 1 wherein said one of the inner and outer surfaces of said transparent sheet is the inner surface of said transparent sheet.

9. The reflective sun screen apparatus of claim 1 wherein said transparent sheet is composed of synthetic resin.

10. A reflective sun screen supported adjacent an interior surface of an outwardly contoured rear window pane in an automobile, said sun screen comprising in combination:
   (a) a semi-rigid sheet of transparent material, said transparent sheet having an outer surface and an opposed inner surface, said outer surface and an opposed inner surface, said outer surface being adjacent to the window pane;
   (b) a reflective layer disposed on the outer surface of said transparent sheet, said reflective layer being transparent, said transparent sheet and said reflective layer being cut to dimensions such that all portions of said transparent sheet and said reflective layer except the pair of opposed edges thereof are in fixed spaced relationship to the window pane and are held to approximately follow the contour of the window pane by engagement of the pair of opposed edges of said transparent sheet and said relective layer with the inner edges of a frame or molding disposed along the periphery of the window pane.

11. A reversible sun screen apparatus for attachment adjacent to an interior surface of a window pane in a building, said sun screen apparatus comprising in combination:
   (a) a transparent sheet of semi-rigid synthetic resin, said transparent sheet having a first surface and an opposed second surface;
   (b) a reflective layer on the first surface of said transparent sheet, said reflective layer being transparent, said reflective layer having a highly reflective outer surface and an inner surface of low reflectivity adjacent said transparent sheet, said reflective layer being substantially colored or tinted; and
   (c) attachment means for attaching a plurality of respectively opposed peripheral edge portions of said transparent sheet to a frame surrounding the window pane to support said sun screen in fixed substantially parallel spaced relationship with said window pane, said attachment means being easily movable to facilitate convenient removal of said reflective sun screen,
whereby said reflective sun screen apparatus can be installed adjacent to the window pane with said highly reflective outer surface of said reflective layer oriented outward during hot months of the year and can be easily reversed and installed with said highly reflective outer surface of said reflective layer oriented inwardly with respect to the building during cold months of the year.

12. A method of using a reflective sun screen in a building to reduce glare of incoming sunlight and to improve conservation of energy associated with the building, said method comprising the steps of:
   (a) removably installing the reflective sun screen against or adjacent a window pane of the building and leaving the reflective sun screen in place during hot times of the year, the reflective sun screen including
      (i) a transparent sheet of semi-rigid synthetic resin, said transparent sheet having a first surface and an opposed second surface,
      (ii) a reflective layer having a highly reflective outer surface and a low reflectivity inner surface adjacent the first surface of the transparent sheet, the reflective layer being transparent and having a colored or tinted portion,
   the high reflectivity outer surface of the reflective layer being oriented toward the outside of the building, whereby a substantial proportion of incoming radiation is reflected by the high reflectivity outer surface of the reflective layer and passes through the window pane out of the building without passing through the reflective layer and transparent sheet; and
   (b) reversing the orientation of the reflective sun screen by removing the reflective sun screen and rotating it so that the highly reflective outer surface of the reflective layer is oriented toward the interior of the building and removably installing the reflective sun screen and leaving it in place during cold times of the year against or adjacent the window pane of the building, whereby a substantial proportion of incoming radiation passes through the transparent sheet and the colored or tinted portion of the reflective layer before reaching said highly reflective outer surface and is reflected outwardly, the color or tinted portion absorbing a substantial amount of the heat from the incoming and reflected radiation, the heat being conducted by convection to the interior parts of the building, the transparent sheet tending to insulate the interior of the building from the exterior of the building.

13. A sun screen apparatus for attachment to an interior surface of a permanent rear or side window in a vehicle, said sun screen comprising in combination:
   (a) a tinted transparent sheet of semi-rigid material, said tinted sheet being tinted to reduce intensity of sunlight entering the window pane of the vehicle and passing into the interior of the vehicle; and
   (b) attachment means for engaging said tinted transparent sheet with a frame or molding means surrounding the window pane to support said tinted transparent sheet inside said vehicle in fixed spaced relationship with said window pane, said tinted transparent sheet being held by said attachment means to approximately follow any contour of the window pane, said attachment means including a plurality of spaced rigid brackets engageable with said frame or molding and also engageable with a plurality of respectively opposed peripheral edge portions of said tinted transparent sheet.

14. The sun screen of claim 13 wherein said transparent sheet is composed of synthetic resin.

15. A sun screen supported adjacent to an interior surface of an outwardly contoured side or rear permanent window pane in an automobile, said sun screen comprising a transparent semi-rigid sheet including tinted material, said tinted material being tinted to a color which reduces intensity of sunlight passing into the interior of the automobile through the window pane, said sun screen being wedged between a pair of opposed portions of a frame or molding disposed along the periphery of the window pane, a pair of opposed edges of said sun screen engaging said frame or molding to accomplish said wedging, all portions of said sun screen except said pair of opposed edges thereof being held in fixed spaced relationship to the window pane to approximately follow the contour of the window pane by engagement of the pair of opposed edges of said sun screen with said portions of said frame or molding.

16. The sun screen of claim 15 wherein said transparent semi-rigid sheet is composed of synthetic resin.

* * * * *